United States Patent [19]

Beer et al.

[11] Patent Number: 4,650,648
[45] Date of Patent: Mar. 17, 1987

[54] OZONE GENERATOR WITH A CERAMIC-BASED DIELECTRIC

[75] Inventors: Hans-Rudolf Beer, Binz; Helmut Britsch, Schinznach-Dorf; Michael Hirth, Unterentfelden; Tony Kaiser, Buchs; Ulrich Kogelschatz, Hausen, all of Switzerland

[73] Assignee: BBC Brown, Boveri & Company, Limited, Baden, Switzerland

[21] Appl. No.: 780,306

[22] Filed: Sep. 26, 1985

[30] Foreign Application Priority Data

Oct. 25, 1984 [CH] Switzerland ............... 5099/84

[51] Int. Cl.$^4$ ............... B01J 19/08; C04B 35/00
[52] U.S. Cl. ............... 422/186.07; 204/290 R; 422/186.04; 252/520; 252/623 BT
[58] Field of Search ............... 422/186, 186.07, 906, 422/186.04; 204/290 F, 290 R; 252/62.3 BT, 520

[56] References Cited

U.S. PATENT DOCUMENTS

| | | |
|---|---|---|
| 3,666,505 | 5/1972 | Hoffman et al. |
| 3,673,119 | 6/1972 | Ueoka et al. ............... 252/520 |
| 4,222,783 | 9/1980 | Atsumi et al. ............... 252/62.3 BT X |
| 4,257,856 | 3/1981 | Beni et al. ............... 204/290 F X |
| 4,595,515 | 6/1986 | Wakino et al. ............... 252/520 X |

FOREIGN PATENT DOCUMENTS

| | | |
|---|---|---|
| 3128746 | 2/1983 | Fed. Rep. of Germany ............... 422/186.07 |
| 2040919 | 11/1971 | France . |
| 7306352 | 3/1969 | Japan ............... 252/520 |
| 1103095 | 9/1976 | Japan ............... 422/186.07 |
| 0115004 | 7/1983 | Japan ............... 422/186.07 |

OTHER PUBLICATIONS

Chem. Abs. vol. 90: 113626k.

Primary Examiner—John F. Terapane
Assistant Examiner—Susan Wolffe
Attorney, Agent, or Firm—Oblon, Fisher, Spivak, McClelland & Maier

[57] ABSTRACT

In modern ozone generators high power densities can be achieved using ceramic-based dielectrics and suitable gap widths and double cooling. By constructing the dielectric layer from dielectric powders of different grain size and binding with artificial resin, the long-term breakdown voltage of the dielectric layer can be increased to such an extent that they fulfil the operating requirements.

11 Claims, 2 Drawing Figures

OZONE GENERATOR WITH A CERAMIC-BASED DIELECTRIC

BACKGROUND OF THE INVENTION

1. Field of the Invention

The invention relates to an ozone generator as described in Patent claim 1 (German Offenlegungsschrift No. 3,128,746).

2. Discussion of the Background

In the German Offenlegungsschrift No. 3,128,746 a dielectric which is applied in layer form to a tube-shaped or plate-shaped self-supporting metal body which forms one electrode is proposed for use in ozone generators. This dielectric is a few 100 $\mu$m thick and consists of a ceramic powder homogeneously distributed in a plastic material. Preferably, a phenylmethylpolysiloxane or a modified silicone is used as the plastic material and a ceramic having a linear temperature dependence and a relatively high dielectric constant such as is used inter alia for the manufacture of ceramic capacitors is used for the ceramic powder.

SUMMARY OF THE INVENTION

This invention relates to the facts that with an increase in the proportion by weight of ceramic powder, the dielectric constant of the dielectric layer also increases, but if more than 50% by weight of ceramic powder is used, the dielectric strength of the dielectric decreases considerably.

Consequently limits are obviously imposed on a per se desirable increase in the dielectric constant to raise the power density of the ozone generator. In addition to this, the dielectric strength values achievable are related to the dielectric strength of the dielectric itself. Extensive investigations by the Applicant have shown that this "short-term dielectric strength" is of lesser importance in the operation of an ozone generator. Of greater importance is the behaviour of the dielectric layer when permanently loaded by the discharge attack in the discharge gap of the ozone generator. This characteristic of the dielectric layer, described here as "long-term dielectric strength", is orders of magnitude lower than the "short-term dielectric strength". As a result of the discharge attack, small and very small components are constantly dislodged from the surface of the dielectric. At these defect positions the dielectric is then locally subjected to still greater stress, which results in the further dislodging of particles and ultimately leads to breakdown even at low field strengths.

Our invention, as described in the patent claims, is based on the objective of providing an ozone generator whose dielectric exhibits a substantially higher long-term dielectric strength and makes possible proportions by weight of the dielectric filling material of over 50% by weight.

In this connection the invention is based on the following new knowledge.

If larger grains of a corona-resistant material are included in the dielectric layer in addition to the binding agent and the fine-grained ceramic powder, then fine-grain powder particles and binding agent are indeed dislodged in the surface region of the layer by the discharge attack. The electric field cannot, however, randomly penetrate the holes so formed between the "coarse" grains because an electric discharge is no longer taking place there. A mechanical analogy to this would be the "paving stone effect". In the case of paved roads and paths, limits are imposed on the erosion on the filling material between the paving stones by the paving stones themselves.

Barium titanate is preferably used as the ceramic powder. In addition to a mixture of glass pellets and fused curundum or fused corundum alone, in particular $TiO_2$ grains of appropriate diameter are also suitable as coarse-grain dielectric components of the dielectric layer. Since $TiO_2$ is only available commercially as a fine-grain powder, the coarse grains are obtained by crushing sintered $TiO_2$.

In particular anhydride-hardened epoxy resin is suitable as a hardenable plastic material.

The dielectric is applied, for example, by vacuum casting, by the pressurised gelling process or by the displacement method.

BRIEF DESCRIPTION OF THE DRAWINGS

The invention is explained below in more detail by reference to the drawing.

In the drawing

DETAILED DESCRIPTION OF THE PREFERRED EMBODIMENTS

Figure 1:
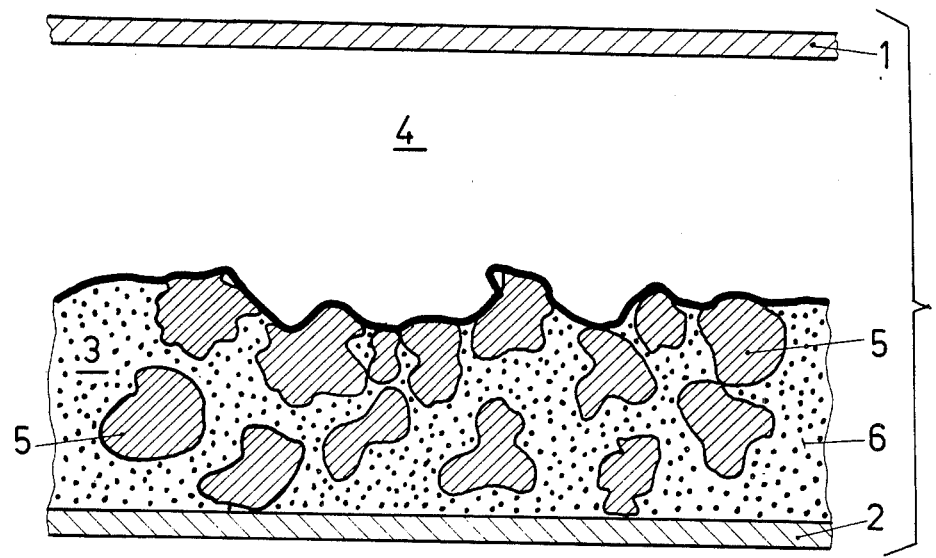
FIG. 1 shows a section through an ozone generator on a highly magnified scale after a prolonged period of use.

In FIG. 1 a first metallic electrode is denoted by 1, and a second metallic electrode by 2. The second electrode 2 exhibits a dielectric layer 3 on the surface facing the first electrode. Between the dielectric layer 3 and the first electrode 1 there extends the discharge gap 4, typically 0.6-2 mm wide, of the ozone generator.

The dielectric layer 3 contains a multiplicity of $TiO_2$ grains 5 more or less uniformly distributed and barium titanate grains 6 in between. Both types of grain are included in a thermosetting, preferably anhydride-hardened, epoxy resin with a relative dielectric constant of $\epsilon_r=3.5$. The thickness of the dielectric layer 3 is between 1 and 5 mm, preferably 2.5 to 3 mm. The barium titanate powder exhibits a grain size of less than 1 $\mu$m and has a relative dielectric constant of $\epsilon_r=2,000$.

The coarse grains consist of $TiO_2$ with grain sizes between 5 and 100 $\mu$m with a relative dielectric constant of $\epsilon_r=100$. These are obtained by sintering fine-grain $TiO_2$ followed by crushing.

With a layer constructed in this manner, which exhibits approximately 42% by volume of artificial resin, approximately 20% by volume of barium titanate powder and approximately 38% by volume of coarse-grain $TiO_2$, a relative dielectric constant for the entire layer of approximately $\epsilon_r=30$ was obtained. The long-term dielectric strength was over 2,000 V/mm.

Comparable values are provided by a dielectric layer 3 containing a mixture of glass pellets and fused corundum as the coarse-grain component of the dielectric layer.

Figure 2:
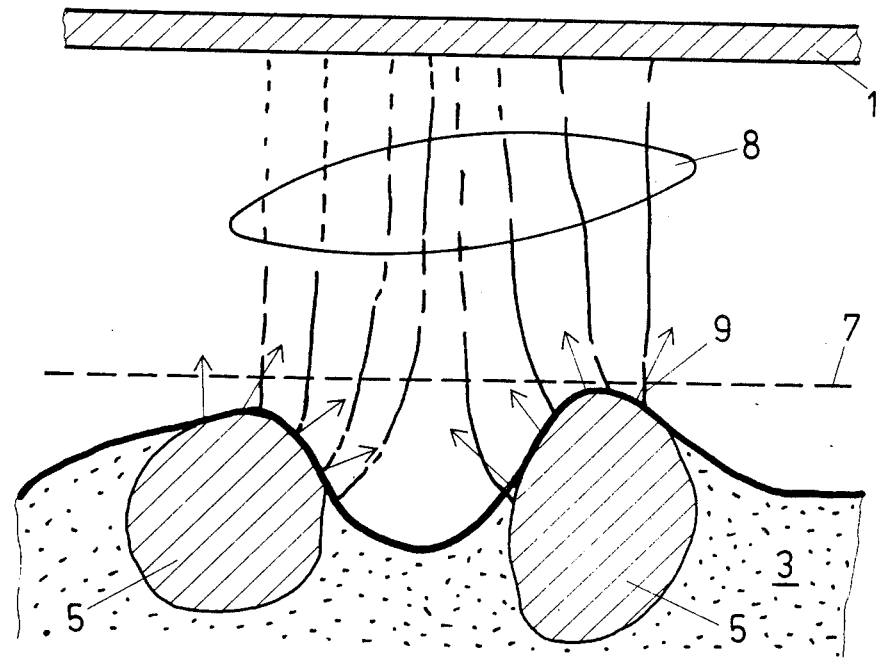
FIG. 2 shows a diagrammatic representation to illustrate the mode of operation of the invention.

FIG. 2 illustrates how the higher long-term dielectric strength compared with that known can be explained:

With increasing operating time the fine-grain components are dislodged from the original dielectric surface 7 by the discharge attack (corona filaments 8). This process also takes place in the gap between two neighbouring $TiO_2$ grains 5. This material cannot, however, be dislodged at an arbitrary depth, since an electric field (symbolised by arrow 9) cannot penetrate a hole to an arbitrary depth and consequently an electric discharge can no longer take place there. The projecting coarse $TiO_2$ grains 5 are not attacked by the discharge.

An ozone generator according to the invention exhibits the following advantages:

Without additional circuit-engineering costs on the supply side, power densities of over 20 kw/m² can be achieved, given a small gap width and double cooling of both electrodes;

Very small (mechanical) tolerances can be maintained which are virtually independent of the technique of application of the dielectric layer, e.g. cast-coating;

Optimum heat transfer between dielectric and heat sink; in contrast to the classical glass tube with an inner electrode, the liquid coolant can be brought directly into contact with the electrode supporting the dielectric;

A special internal contact is unnecessary;

The power factor (cos $\phi$) is better;

The invention can be used both in tube and in plate ozone generators.

What is claimed as new and desired to be secured by Letters Patent of the United States is:

1. An ozone generator having a first and a second metallic electrode with said second metallic electrode having a dielectric layer of 1–5 mm thickness on the surface thereof facing said first electrode, and wherein said dielectric layer comprises a hardenable plastic material filled with a dielectric powder, and wherein said plastic material comprises at most 40% by weight of said dielectric layer, and said dielectric powder, consisting essentially of:
   (a) a barium titanate ceramic powder having a grain size of smaller than 1 $\mu$m; and
   (b) a coarser-grain dielectric component selected from the group consisting of titanium dioxide having a grain size of 5–100 $\mu$m and glass pellets and corundum each having a grain size of 50–150 $\mu$m.

2. The ozone generator according to claim 1, wherein the coarser-grain dielectric component is $TiO_2$ grains which are obtained by crushing sintered $TiO_2$.

3. The ozone generator according to claim 1, wherein anhydride-hardened epoxy resin is used as the hardenable plastic material.

4. The ozone generator according to claim 1, wherein the dielectric is applied by vacuum casting to the second electrode.

5. The ozone generator according to claim 1, wherein the dielectric is applied by the pressurized gelling process to the second electrode.

6. The ozone generator according to claim 1, wherein the dielectric is applied by the displacement method to the second electrode.

7. The ozone generator according to claim 1, wherein said dielectric layer has a thickness of 2.5–3 mm.

8. The ozone generator according to claim 1, wherein said barium titanate powder has a relative dielectric constant, $\epsilon_r$, of 2,000.

9. The ozone generator according to claim 1, wherein said $TiO_2$ has a relative dielectric constant, $\epsilon_r$, of 100.

10. The ozone generator according to claim 1, wherein between the dielectric layer and the first electrode is a discharge gap of 0.6–2 mm.

11. The ozone generator according to claim 1, wherein said dielectric layer comprises 42% by volume of said hardenable plastic material, about 20% by volume of said barium titanate powder and about 38% by volume of said coarser-grain $TiO_2$, having a relative dielectric constant for the entire layer of approximately 30 and having a long-term dielectric strength of over 2000 V/mm.

* * * * *